United States Patent
Spaur et al.

(10) Patent No.: US 7,336,435 B1
(45) Date of Patent: *Feb. 26, 2008

(54) METHOD AND SYSTEM FOR COLLECTING SERVO FIELD DATA FROM PROGRAMMABLE DEVICES IN EMBEDDED DISK CONTROLLERS

(75) Inventors: Michael R. Spaur, Dana Point, CA (US); Raymond A. Sandoval, Aliso Viejo, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/388,410

(22) Filed: Mar. 24, 2006

Related U.S. Application Data

(63) Continuation of application No. 10/385,405, filed on Mar. 10, 2003, now Pat. No. 7,064,915.

(51) Int. Cl.
G11B 5/09 (2006.01)
G11B 21/02 (2006.01)
(52) U.S. Cl. .............................. 360/51; 360/48; 360/75
(58) Field of Classification Search ...................... None
See application file for complete search history.

(56) References Cited

U.S. PATENT DOCUMENTS

| | | | |
|---|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 pages.

(Continued)

*Primary Examiner*—William Korzuch
*Assistant Examiner*—Daniell L. Negrón

(57) ABSTRACT

A servo controller for an embedded disk controller comprises a read channel interface that includes a programmable control logic that receives a servo field detected signal from a module that detects a servo field start bit. A memory in the read channel interface is enabled by the programmable control logic for receiving servo field data from a read channel device, wherein the programmable control logic is configured to operate in a first mode and a second mode allowing the servo controller to process servo data from the read channel device. The servo controller processes the servo data using first and second data widths during the first and second modes, respectively.

15 Claims, 8 Drawing Sheets

U.S. PATENT DOCUMENTS

| | | |
|---|---|---|
| 4,603,382 A | 7/1986 | Cole et al. |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson et al. |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,329,630 A | 7/1994 | Badwin |
| 5,339,443 A | 8/1994 | Lockwood |
| 5,349,667 A | 9/1994 | Kaneko |
| 5,361,266 A | 11/1994 | Kodama et al. |
| 5,361,267 A | 11/1994 | Godiwala et al. |
| 5,408,644 A | 4/1995 | Schneider et al. |
| 5,408,673 A | 4/1995 | Childers et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini et al. |
| 5,546,545 A | 8/1996 | Rich |
| 5,546,548 A | 8/1996 | Chen et al. |
| 5,557,764 A | 9/1996 | Stewart et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,590,380 A | 12/1996 | Yamada et al. |
| 5,592,404 A | 1/1997 | Zook |
| 5,600,662 A | 2/1997 | Zook |
| 5,602,857 A | 2/1997 | Zook et al. |
| 5,603,035 A | 2/1997 | Erramoun et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,659,759 A | 8/1997 | Yamada |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,511 A | 3/1998 | Schell et al. |
| 5,729,718 A | 3/1998 | Au |
| 5,734,848 A | 3/1998 | Gates et al. |
| 5,740,466 A | 4/1998 | Geldman et al. |
| 5,745,793 A | 4/1998 | Atsatt et al. |
| 5,754,759 A | 5/1998 | Clarke et al. |
| 5,758,188 A | 5/1998 | Appelbaum et al. |
| 5,784,569 A | 7/1998 | Miller et al. |
| 5,787,483 A | 7/1998 | Jam et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,826,093 A | 10/1998 | Assouad et al. |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,928,367 A | 7/1999 | Nelson et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,021,458 A | 2/2000 | Jayakumar et al. |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |

| | | |
|---|---|---|
| 6,094,320 A | 7/2000 | Ahn |
| 6,105,119 A | 8/2000 | Kerr et al. |
| 6,108,150 A * | 8/2000 | Lee .................... 360/48 |
| 6,115,778 A | 9/2000 | Miyake et al. |
| 6,124,994 A | 9/2000 | Malone, Sr. |
| 6,134,063 A | 10/2000 | Weston-Lewis et al. |
| 6,157,984 A | 12/2000 | Fisher et al. |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,285,632 B1 * | 9/2001 | Ueki .................... 379/32.01 |
| 6,297,926 B1 | 10/2001 | Ahn |
| 6,314,480 B1 | 11/2001 | Nemazie et al. |
| 6,330,626 B1 | 12/2001 | Dennin et al. |
| 6,381,659 B2 | 4/2002 | Proch et al. |
| 6,401,149 B1 | 6/2002 | Dennin et al. |
| 6,401,154 B1 | 6/2002 | Chiu et al. |
| 6,421,760 B1 | 7/2002 | McDonald et al. |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,530,000 B1 | 3/2003 | Krantz et al. |
| 6,574,676 B1 | 6/2003 | Megiddo |
| 6,583,943 B2 * | 6/2003 | Malone, Sr. .................... 360/48 |
| 6,629,204 B2 | 9/2003 | Tanaka et al. |
| 6,662,253 B1 | 12/2003 | Gary et al. |
| 6,662,334 B1 | 12/2003 | Stenfort |
| 6,721,828 B2 | 4/2004 | Verinsky et al. |
| 6,826,650 B1 | 11/2004 | Krantz et al. |
| 6,947,233 B2 * | 9/2005 | Toda .................... 360/51 |
| 7,064,915 B1 * | 6/2006 | Spaur et al. .................... 360/51 |
| 2001/0044873 A1 | 11/2001 | Wilson et al. |
| 2002/0124132 A1 * | 9/2002 | Haines et al. .................... 711/112 |
| 2003/0037225 A1 | 2/2003 | Deng et al. |
| 2003/0070030 A1 | 4/2003 | Smith et al. |
| 2003/0084269 A1 | 5/2003 | Drysdale et al. |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blahut R. Digital Transmission of Information (Dec. 4, 1990), pp. 429-430.
Hwang, Kai and Briggs, Faye A., "Computer Architecture and Parallel Processing", pp. 156-164.
Zeidman, Bob, "Interleaving DRAMS for faster access", System Design ASIC & EDA, pp. 24-34 (Nov. 1993).
P.M. Bland et al, "Shared Storage Bus Circuitry", IBM Technical Disclosure Bulletin, vol. 25, No. 4, Sep. 1982, pp. 2223-2224.
PCT Search Report for PCT/US00/07780 mailed Aug. 2, 2000, 4 pages.
"Embedded Risc Microcontroller Core ARM7TDMI". Revision 0673CS-11/99. Atmel Corporation.
PCT Search Report for PCT/US01/22404, mailed Jan. 29, 2003, 4 pages.
PCT International Search Report, Doc. No. PCT/US2004/007119, dated Aug. 25, 2005.
PCI Local Bus Specification, Revision 2.1, Jun. 1, 1995, pp. 9-12, 21-23, 33-42, 108-109, 235-243.
Structure Computer Organization, 3rd Edition, By Andrew S. Tanenbaum, pp. 11-13.
"Memory and Peripheral Interface", Chapter 5—LH77790A/B User's Guide (Version 1.0), pp. 5-1 to 5-35.

* cited by examiner

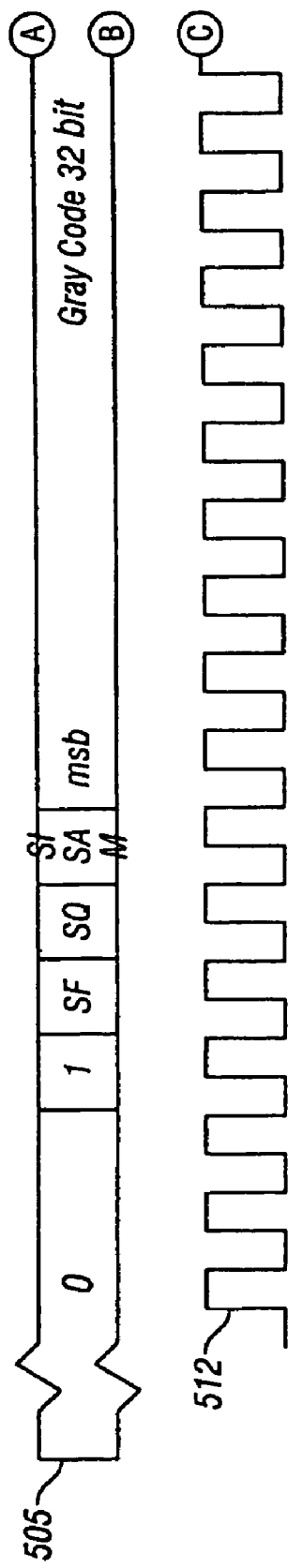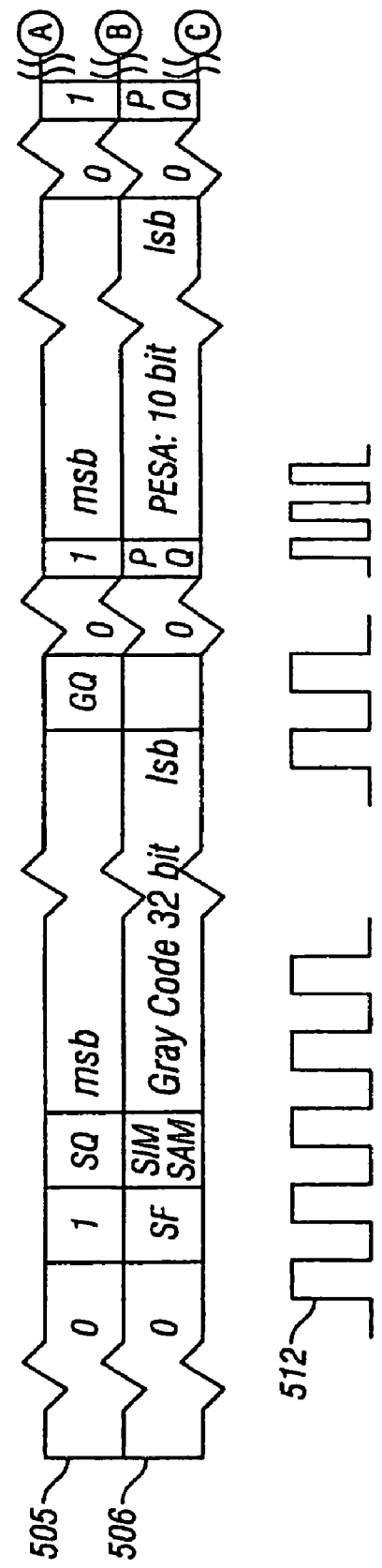
FIG. 6A-1
FIG. 6B-1

METHOD AND SYSTEM FOR COLLECTING SERVO FIELD DATA FROM PROGRAMMABLE DEVICES IN EMBEDDED DISK CONTROLLERS

CROSS-REFERENCE TO RELATED APPLICATIONS

This application is a continuation of U.S. patent application Ser. No. 10/385,405, filed on Mar. 10, 2003, and related to the following U.S. patent applications: U.S. patent application Ser. No. 10/384,991, filed Mar. 10, 2003; U.S. patent application Ser. No. 10/385,022, filed Mar. 11, 2003 (now U.S. Pat. No. 6,936,649, issued Aug. 30, 2005); U.S. patent application Ser. No. 10/385,042, filed Mar. 10, 2003; U.S. patent application Ser. No. 10/385,056, filed Mar. 10, 2003; U.S. patent application Ser. No. 10/385,992, filed Mar. 10, 2003; and U.S. patent application Ser. No. 10/385,039, filed Mar. 10, 2003. The disclosures of the above applications are incorporated herein by reference.

FIELD OF THE INVENTION

The present invention relates generally to storage systems, and more particularly to disk drive servo controllers.

BACKGROUND OF THE INVENTION

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The main memory is typically smaller than disk drives and may be volatile. Programming data is often stored on the disk drive and read into main memory as needed. The disk drives are coupled to the host system via a disk controller that handles complex details of interfacing the disk drives to the host system. Communications between the host system and the disk controller is usually provided using one of a variety of standard I/O bus interfaces.

Typically, a disk drive includes one or more magnetic disks. Each disk (or platter) typically has a number of concentric rings or tracks (platter) on which data is stored. The tracks themselves may be divided into sectors, which are the smallest accessible data units. A positioning head above the appropriate track accesses a sector. An index pulse typically identifies the first sector of a track. The start of each sector is identified with a sector pulse. Typically, the disk drive waits until a desired sector rotates beneath the head before proceeding with a read or writes operation. Data is accessed serially, one bit at a time and typically, each disk has its own read/write head.

FIG. 1 shows a disk drive system 100 with platters 101A and 101B, an actuator 102 and read/write head 103. Typically, multiple platters/read and write heads are used. Platters 101A-101B have assigned tracks for storing system information, servo data and user data.

The disk drive is connected to the disk controller that performs numerous functions, for example, converting digital to analog data signals, disk formatting, error checking and fixing, logical to physical address mapping and data buffering. To perform the various functions for transferring data, the disk controller includes numerous components.

To access data from a disk drive (or to write data), the host system must know where to read (or write data to) the data from the disk drive. A driver typically performs this task. Once the disk drive address is known, the address is translated to cylinder, head and sector, based on platter geometry and sent to the disk controller. Logic on the hard disk looks at the number of cylinders requested. Servo controller firmware instructs motor control hardware to move read/write heads 103 to the appropriate track. When the head is in the correct position, it reads the data from the correct track.

Typically, read and write head 103 has a write core for writing data in a data region, and a read core for magnetically detecting the data written in the data region of a track and a servo pattern recorded on a servo region.

A servo system 104 detects the position of head 103 on platter 101A according to the phase of a servo pattern detected by the read core of head 103. Servo system 104 then moves head 103 to the target position.

Servo system 104 servo-controls head 103 while receiving feedback for a detected position obtained from a servo pattern so that any positional error between the detected position and the target position is negated.

Typically, a servo controller in system 104 communicates with a data recovery device. One such device is shown in FIG. 3, as the "read channel device 303". An example of such a product is "88C7500 Integrated Read channel" device sold by Marvell Semiconductor Inc®.

Typically, servo information is recorded in fixed amounts for a given product. In conventional systems, all the elements of servo fields are "hard-wired" to include details of interface timing between the servo controller and the read channel device 303. The conventional approach has drawbacks. For example, the servo controller design must be modified each time the format of any of the servo data elements changes. Also, if the interface between the read channel device 303 and servo controller (303A, FIG. 4) changes, the servo controller must be modified.

Therefore, what is desired is an efficient controller that can accommodate multiple interfaces and also future changes in servo field formats.

SUMMARY OF THE INVENTION

A servo controller for an embedded disk controller comprises a read channel interface that includes a programmable control logic that receives a servo field detected signal from a module that detects a servo field start bit. A memory in the read channel interface is enabled by the programmable control logic for receiving servo field data from a read channel device, wherein the programmable control logic is configured to operate in a first mode and a second mode allowing the servo controller to process servo data from the read channel device.

In other features of the invention, the first mode is an m wire mode, the second mode is an n wire mode, m and n are integers, and m≠n. In the first mode the servo controller processes the servo data at a first data width and in the second mode the servo controller processes the servo data at a second data width. A filter receives unfiltered servo data from the memory. A counter receives the servo field detected signal. The programmable control logic may be configured by a processor in the embedded disk controller.

A method for collecting servo field data from programmable devices in embedded disk controllers comprises receiving a servo field detection signal at a programmable control logic in a read channel interface in a servo controller, wherein the programmable control logic is configured to operate both in a first mode and a second mode allowing the servo controller to process servo data from a read channel device, receiving control signal for capturing servo field data, and organizing servo field data.

In other features of the invention, the first mode is an m wire mode, the second mode is an n wire mode, m and n are integers, and m≠n. In the first mode the servo controller processes the servo data at a first data width and in the second mode the servo controller processes the servo data at a second data width. The programmable control logic in the read channel interface receives the servo field detection signal from a detect module. A memory in the read channel interface receives the control signal from the programmable control logic. The memory sends unfiltered servo field data to a bitmap filter.

A servo controller for an embedded disk controller comprises read channel interface means that includes a programmable control logic for receiving a servo field detected signal from a module that detects a servo field start bit and memory means in the read channel interface that is enabled by the programmable control logic for receiving servo field data from a read channel device, wherein the programmable control logic is configured to operate in a first mode and a second mode allowing the servo controller to process servo data from the read channel device.

In other features of the invention, the first mode is an m wire mode, the second mode is an n wire mode, m and n are integers, and m≠n. In the first mode the servo controller processes the servo data at a first data width and in the second mode the servo controller processes the servo data at a second data width. The servo controller further comprises filter means for receiving unfiltered servo data from the memory means. The servo controller further comprises counter means for receiving the servo field detected signal. The programmable control logic may be configured by a processor in the embedded disk controller.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of an embedded disk controller will be described initially. The specific architecture and operation of the preferred embodiment will then be described.

Figure 1:
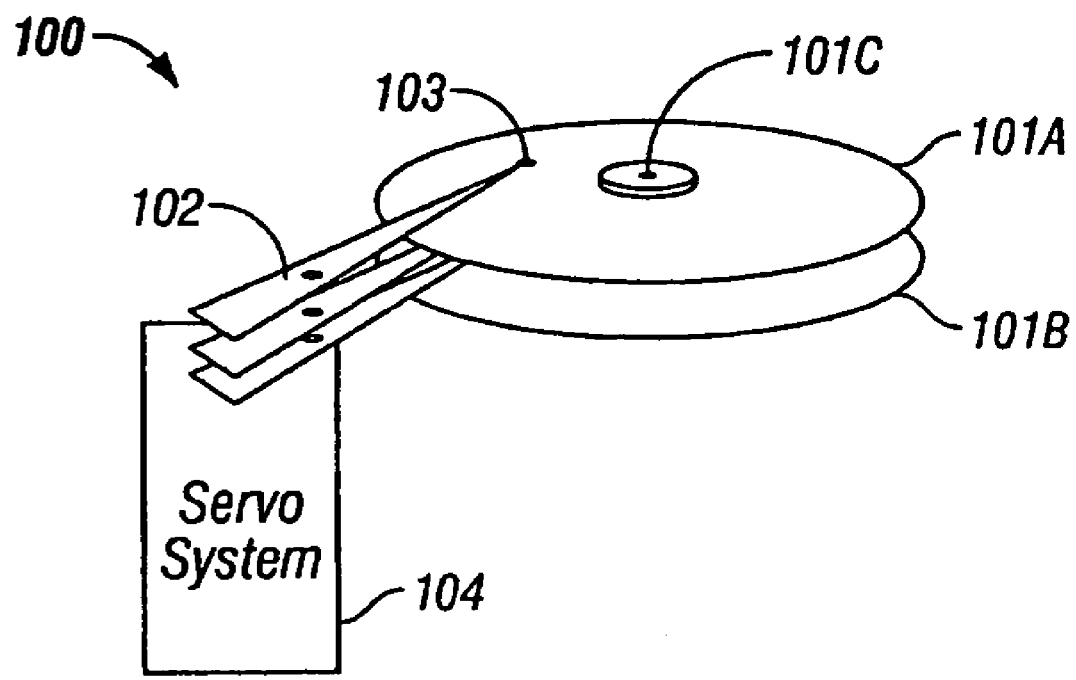
FIG. 1 shows a block diagram of a disk drive.
Figure 2:
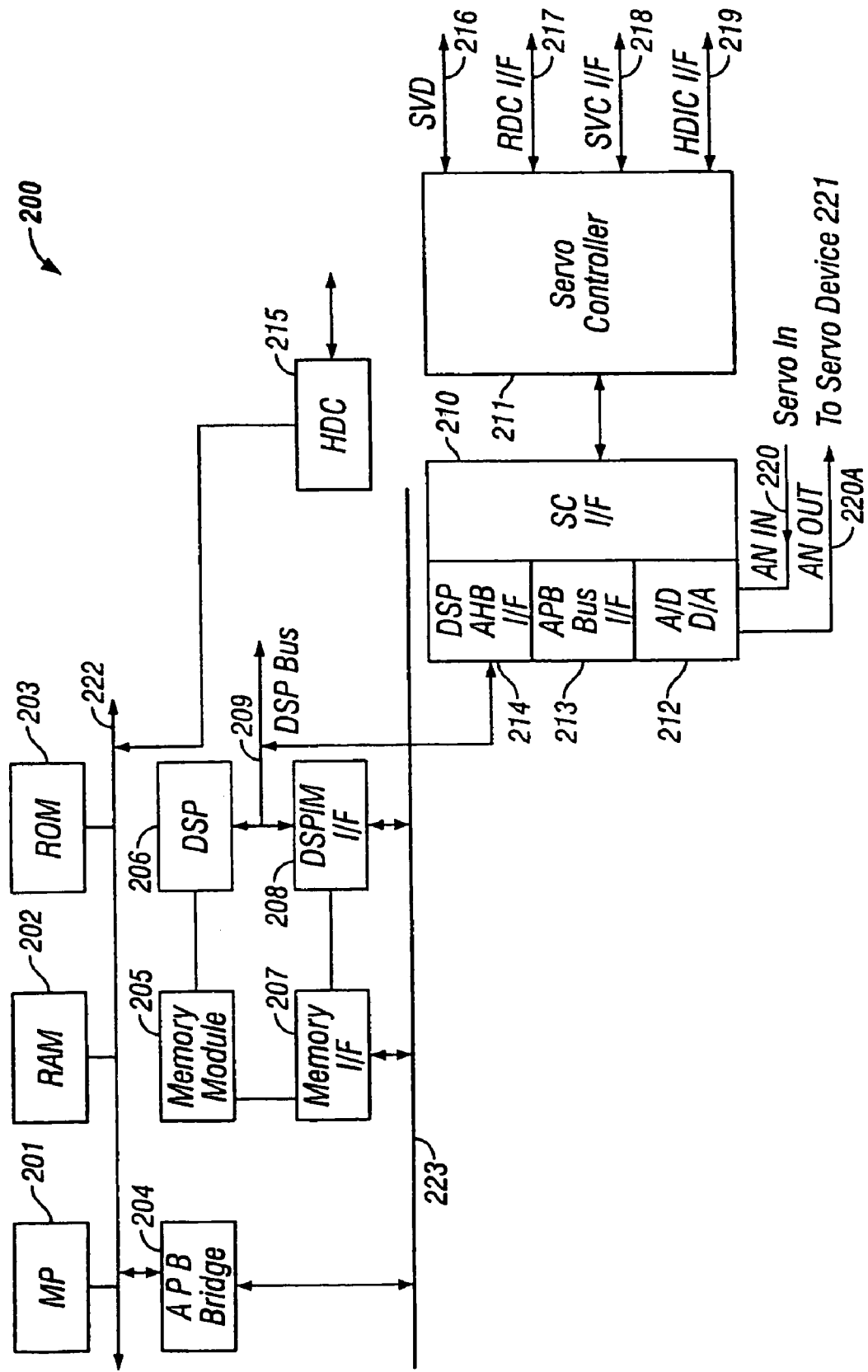
FIG. 2 is a block diagram of an embedded disk controller system, according to one aspect of the present invention.

FIG. 2 shows a block diagram of an embedded disk controller system 200 according to one aspect of the present invention. System 200 may be an application specific integrated circuit ("ASIC").

System 200 includes a microprocessor ("MP") 201 that performs various functions described below. MP 201 may be a Pentium® Class processor designed and developed by Intel Corporation® or an ARM processor. MP 201 is operationally coupled to various system 200 components via buses 222 and 223. Bus 222 may be an Advanced High performance (AHB) bus as specified by ARM Inc. Bus 223 may an Advanced Peripheral Bus ("APB") as specified by ARM Inc. The specifications for AHB and APB are incorporated herein by reference in their entirety.

System 200 is also provided with a random access memory (RAM) or static RAM (SRAM) 202 that stores programs and instructions, which allows MP 201 to execute computer instructions. MP 201 may execute code instructions (also referred to as "firmware") out of RAM 202.

System 200 is also provided with read only memory (ROM) 203 that stores invariant instructions, including basic input/output instructions.

System 200 is also provided with a digital signal processor ("DSP") 206 that controls and monitors various servo functions through DSP interface module ("DSPIM") 208 and servo controller interface 210 operationally coupled to a servo controller ("SC") 211.

DSPIM 208 interfaces DSP 206 with MP 201 and allows DSP 206 to update a tightly coupled memory module (TCM) 205 (also referred to as "memory module" 205) with servo related information. MP 201 can access TCM 205 via DSPIM 208.

Servo controller interface ("SCI") 210 includes an APB interface 213 that allows SCI 210 to interface with APB bus 223 and allows SC 211 to interface with MP 201 and DSP 206.

SCI 210 also includes DSPAHB interface 214 that allows access to DSPAHB bus 209. SCI 210 is provided with a digital to analog and analog to digital converter 212 that converts data from analog to digital domain, and vice-versa. Analog data 220 enters module 212 and leaves as analog data 220A to a servo device 221.

SC 211 has a read channel device (RDC) serial port 217, a motor control ("SVC") serial port 218 for a "combo" motor controller device, a head integrated circuit (HDIC) serial port 219 and a servo data ("SVD") interface 216 for communicating with various devices.

Figure 3:
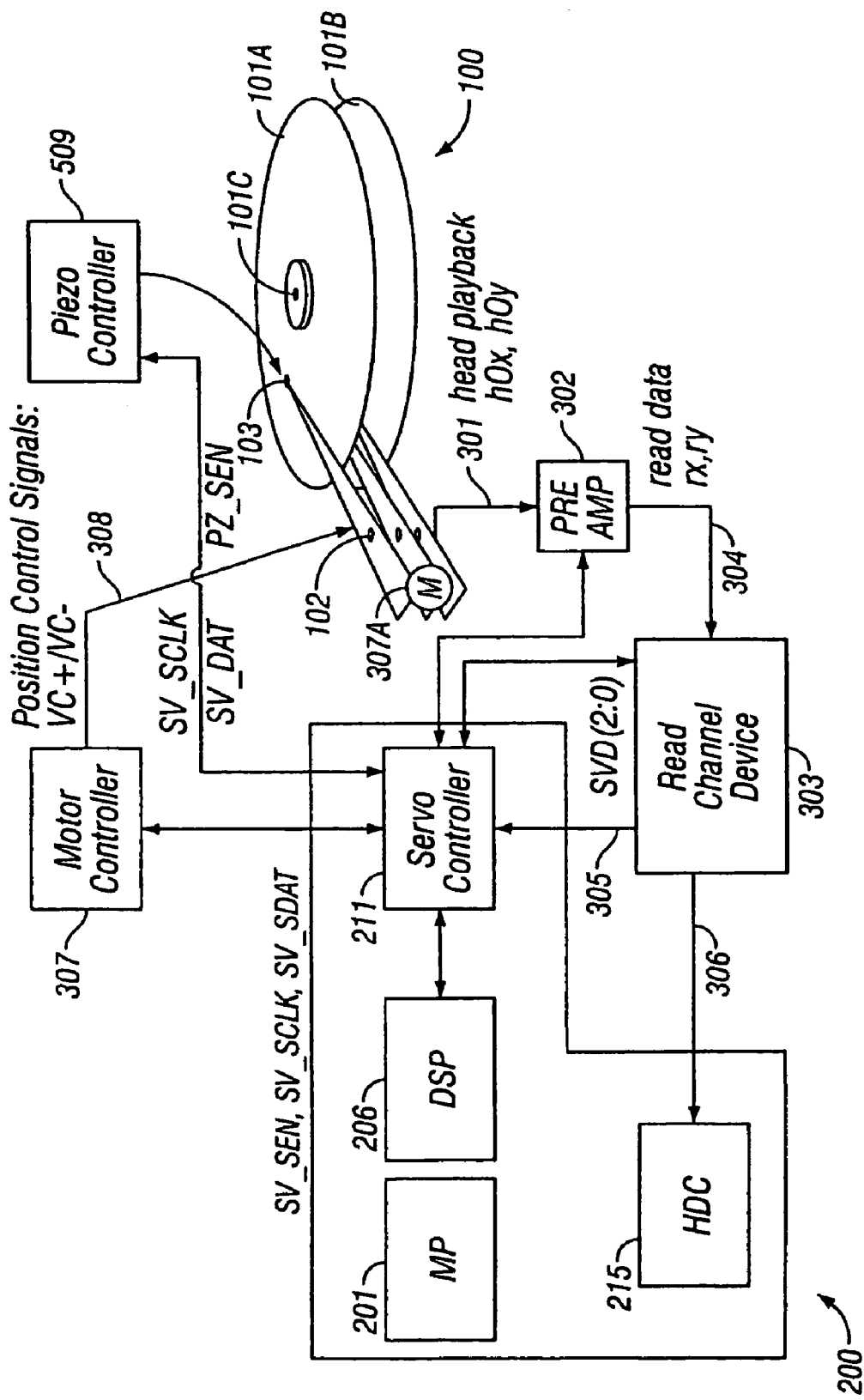
FIG. 3 is a block diagram showing the various components of the FIG. 3 system and a two-platter, four-head disk drive, according to one aspect of the present invention.

FIG. 3 shows a block diagram with disk 100 coupled to system 200, according to one aspect of the present invention. FIG. 3 shows a read channel device 303 that receives signals from a pre-amplifier 302 (also known as head integrated circuit (HDIC)) coupled to disk 100. As discussed above, one example of a read channel device 303 is manufactured by Marvell Semiconductor Inc.®, Part Number 88C7500, while pre-amplifier 302 may be a Texas instrument, Part Number SR1790. Pre-amplifier 302 is also operationally coupled to SC 211. Servo data ("SVD") 305 is sent to SC 211.

A motor controller 307 (also referred to as device 307), (for example, a motor controller manufactured by Texas Instruments (D, Part Number SH6764) sends control signals 308 to control actuator movement using motor 307A. It is noteworthy that spindle 101C is controlled by a spindle motor (not shown) for rotating platters 101A and 101B. SC 211 sends plural signals to motor controller 307 including clock, data and "enable" signals to motor controller 307 (for example, SV_SEN, SV_SCLK and SV_SDAT).

SC 211 is also operationally coupled to a piezo controller 509 that allows communication with a piezo device (not shown). One such piezo controller is sold by Rolm Electronics®, Part Number BD6801FV. SC 211 sends clock, data and enable signals to controller 509 (for example, SV_SEN, SV_SCLK and SV_SDAT).

Figure 4:
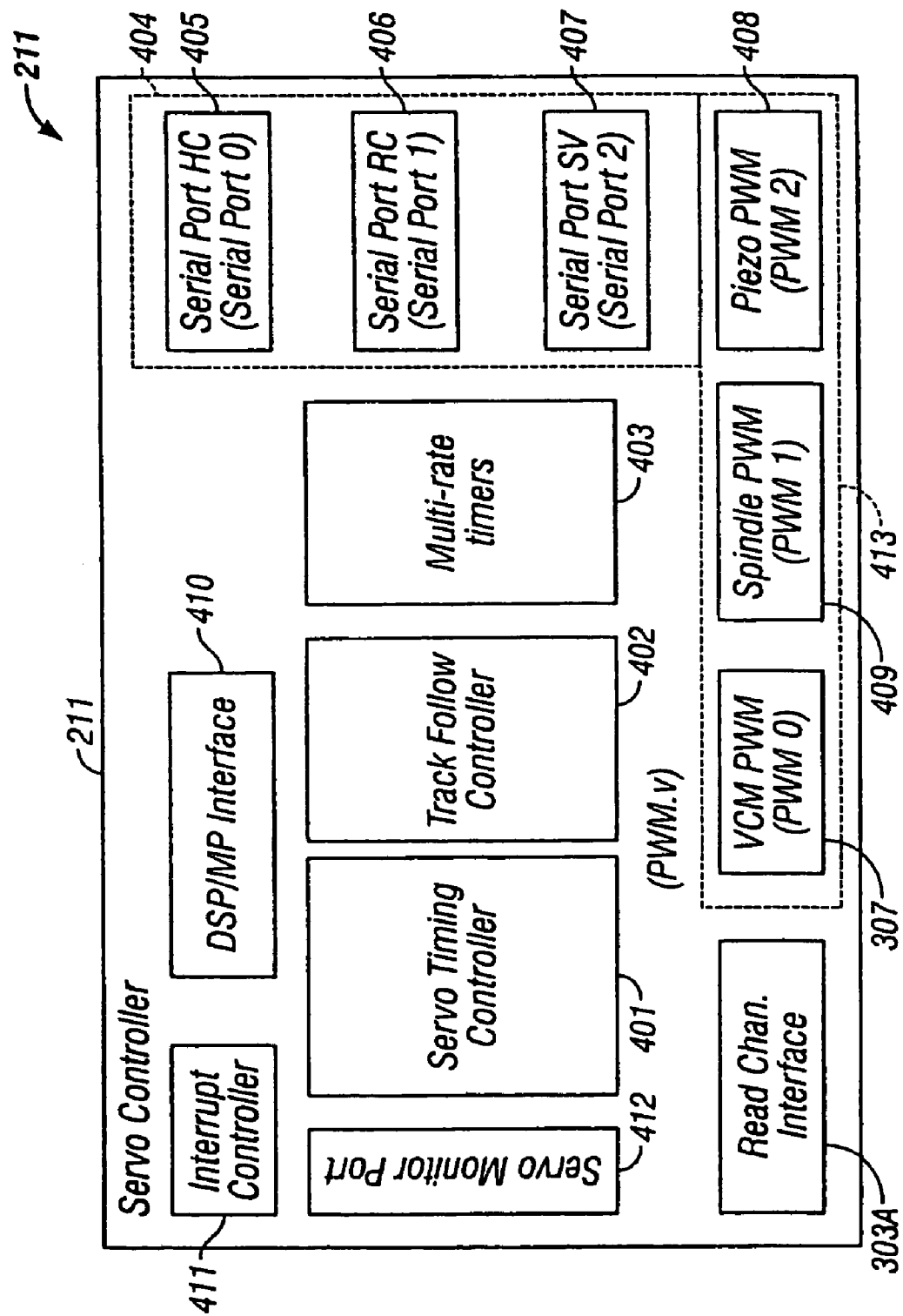
FIG. 4 is a block diagram of a servo controller, according to one aspect of the present invention.

FIG. 4 shows a block diagram of SC 211, according to one aspect of the present invention. FIG. 4 shows SC 211 with a serial port controller 404 for controlling various serial ports 405-407.

SC 211 also has a servo-timing controller ("STC") 401 that automatically adjusts the time base when a head change occurs. Servo controller 211 includes an interrupt controller 411 that can generate an interrupt to DSP 206 and MP 201. Interrupts may be generated when a servo field is found (or not found) and for other reasons. SC 211 includes a servo-monitoring port 412 that monitors various signals to SC 211.

SC 211 uses a pulse width modulation unit ("PWM") 413 for supporting control of motor 307A PWM, and a spindle motor PWM 409 and a piezo PWM 408.

MP 201 and/or DSP 206 use read channel device 303 for transferring configuration data and operational commands through SC 211 (via read channel interface 303A).

Figure 5:
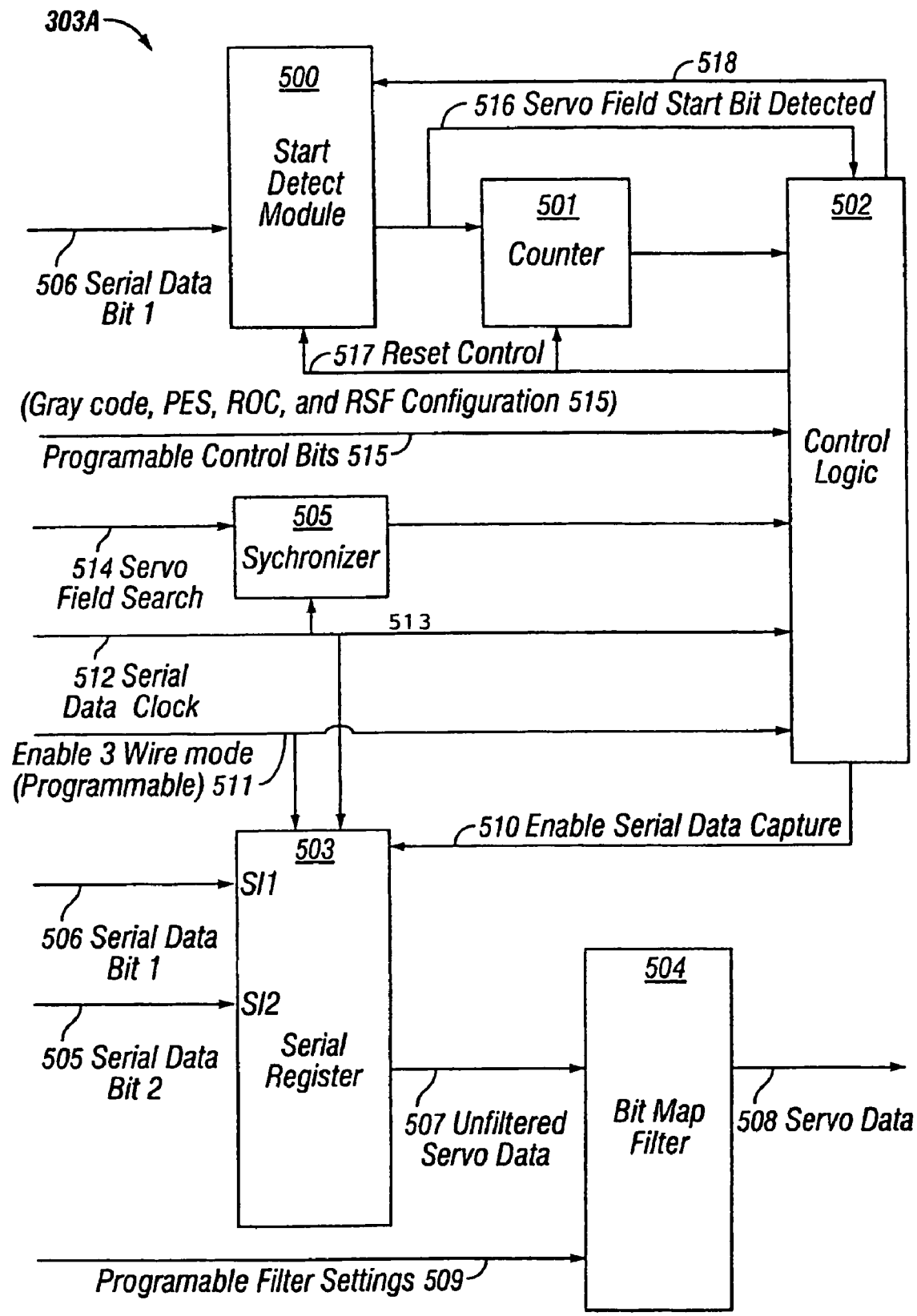
FIG. 5 is a block diagram of a read channel interface, according to one aspect of the present invention.

FIG. 5 is a block diagram of read channel interface (also referred to as Interface 303A) 303A. Serial data (505 and 506) from read channel device 303 is sent to serial register 503 and a start detect module 500. Start detect module 500 sends a signal 516 to a counter 501 and control logic 502. Signal 516 is generated after a servo field start bit is detected.

Control logic 502 includes a state machine (not shown) that may be configured by signal 515. Signal 515 includes gray code, Position Error Signal ("PES"), run out correction ("ROC") and Recovered Service field ("RSF") configuration information. As is well known in the art, gray code is the front portion of the data as read from a media. MP 201 or DSP 206 may send signal 515.

Servo field search signal 514 is received from DSP 206 or from timer hardware, by a synchronizer 505. Signal 514 indicates the time to begin the search for servo field data. Synchronizer 505 then synchronizes signal 514 with serial data clock 512. Synchronized signal 513 and serial data clock 512 are sent to control logic 502.

Control logic generates signal 510 that is sent to serial register 503. Signal 510 enables serial register 503 to receive data from read channel device 303. Serial register 503 transfers unfiltered data 507 to a bitmap filter 504 that filters data 507 to generate servo data 508 that can be read by DSP 206 or MP 201. DSP 206 or MP 201 using firmware and through signal 509 may set filter 504.

Control logic 502 can operate under plural modes by using signal 511. For example, control logic 502 may operate under a two-wire mode (one clock/one data) or three-wire mode (one clock/two data). Control logic 502 also sends a signal 518 to start detect module 500 that requests start detect module 500 to look for servo data.

Figures 2, 6A:
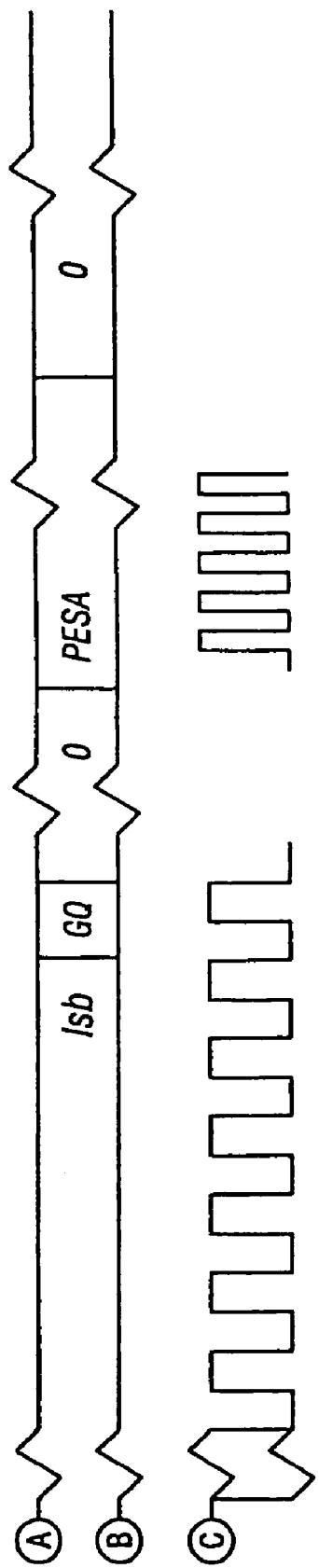
FIGS. 6A and 6B are timing diagrams for two-wire and three-wire interface systems, respectively, according to one aspect of the present invention.
Figures 2, 6B:
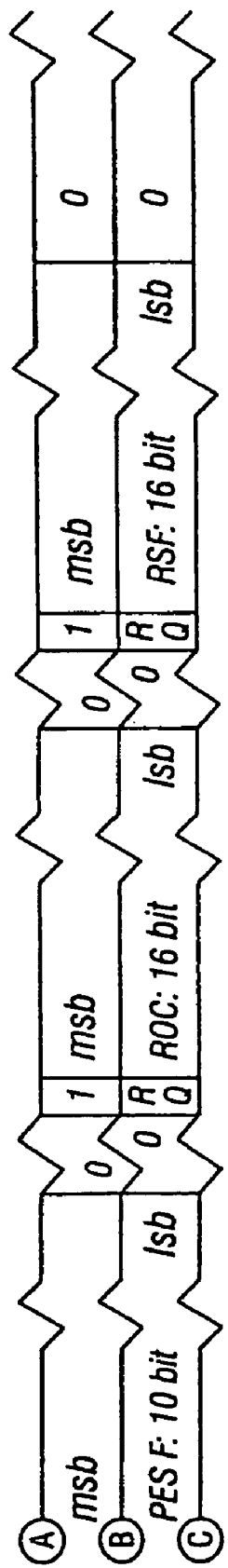

FIGS. 6A and 6B show timing diagrams for two-wire and three-wire systems, according to one aspect of the present invention.

Figure 7:
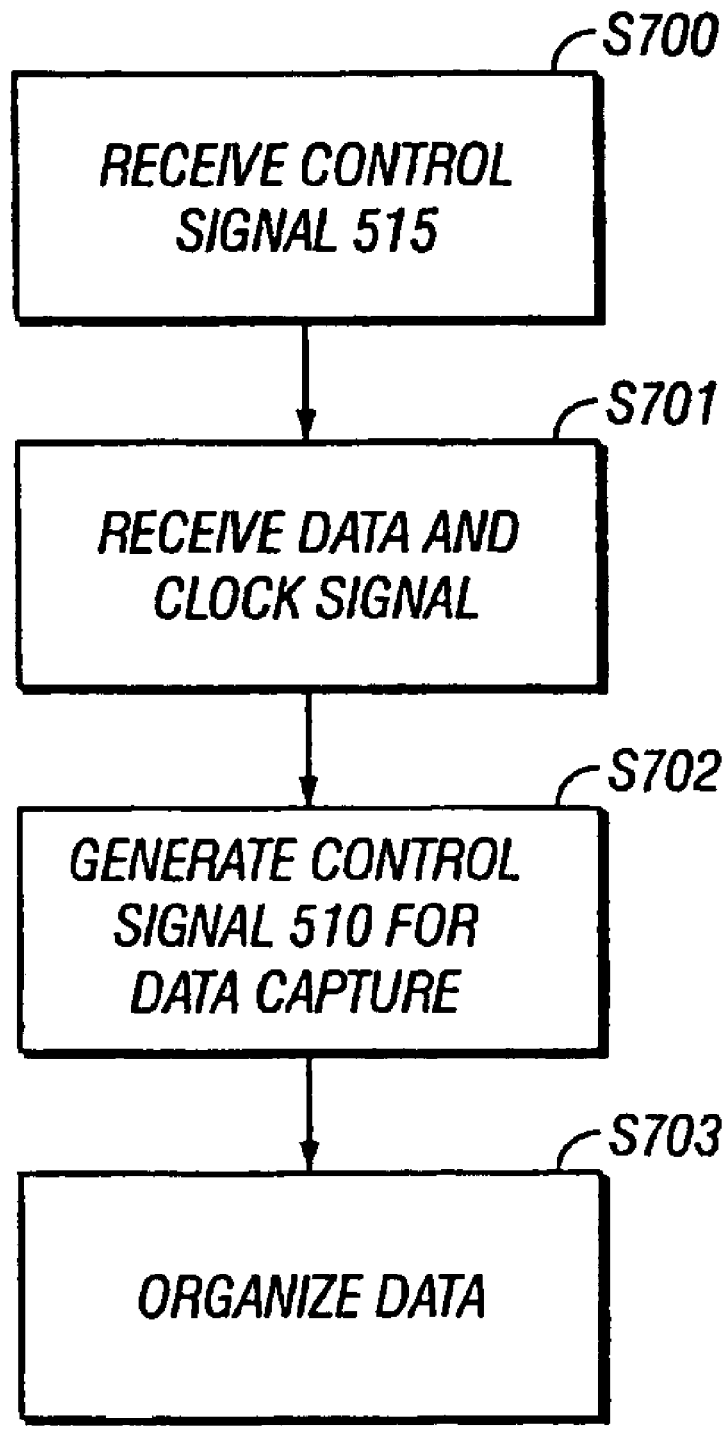
FIG. 7 shows a flow diagram of executable process steps, according to one aspect of the present invention.

FIG. 7 is a flow diagram of executable process steps, according to one aspect of the present invention.

In step S701, serial register 503 receives clock signal 512 and serial data (505 and 506).

In step S700, control logic 502 receives control signal 515 from MP 201 and/or DSP 206. Signal 515 includes gray code, PES, ROC and RSF configuration information.

In step S702, control logic 502 generates signal 510 that enables serial register to capture data.

In step S703, data is organized so that MP 201 and/or DSP 206 can read it. In one aspect, unfiltered servo data 507 is sent to a bit map filter 504 that filters the data and generates servo data 508 so that it can be read by DSP 206 or MP 201.

In one aspect of the present invention, elements of the servo fields are programmable and can be adjusted by firmware. Hence, hardware changes are not required to keep up with format changes. In another aspect of the present invention, both two and three wire systems may be used without using any additional circuits.

Although the present invention has been described with reference to specific embodiments, these embodiments are illustrative only and not limiting. For example, the term signal as used herein includes commands. Many other applications and embodiments of the present invention will be apparent in light of this disclosure and the following claims.

What is claimed is:

1. A servo controller for an embedded disk controller, comprising:
a read channel interface that includes a programmable control logic that receives a servo field detected signal from a module that detects a servo field start bit; and
a memory in the read channel interface that is enabled by the programmable control logic for receiving servo field data from a read channel device, wherein the programmable control logic is configured to operate in a first mode and a second mode allowing the servo controller to process servo data from the read channel device,
wherein the servo controller processes the servo data using first and second data widths during said first and second modes, respectively.

2. The servo controller of claim 1 further comprising a filter that receives unfiltered servo data from the memory.

3. The servo controller of claim 1 further comprising a counter that receives the servo field detected signal.

4. The servo controller of claim 1 wherein the programmable control logic may be configured by a processor in the embedded disk controller.

5. A servo controller for an embedded disk controller, comprising:
a read channel interface that includes a programmable control logic that receives a servo field detected signal from a module that detects a servo field start bit; and
a memory in the read channel interface that is enabled by the programmable control logic for receiving servo field data from a read channel device, wherein the programmable control logic is configured to operate in a first mode and a second mode allowing the servo controller to process servo data from the read channel device, wherein the first mode is an m wire mode, the second mode is an n wire mode, m and n are integers, and m≠n.

6. A method for collecting servo field data from programmable devices in embedded disk controllers, comprising:
receiving a servo field detection signal at a programmable control logic in a read channel interface in a servo controller, wherein the programmable control logic is configured to operate both in a first mode and a second mode allowing the servo controller to process servo data from a read channel device;
receiving control signal for capturing servo field data; and
organizing servo field data,
wherein the servo data is processed using first and second data widths during said first and second modes, respectively.

7. The method of claim 6 wherein the programmable control logic in the read channel interface receives the servo field detection signal from a detect module.

8. The method of claim 6 wherein a memory in the read channel interface receives the control signal from the programmable control logic.

9. The method of claim 8 wherein the memory sends unfiltered servo field data to a bitmap filter.

10. A method for collecting servo field data from programmable devices in embedded disk controllers, comprising:
receiving a servo field detection signal at a programmable control logic in a read channel interface in a servo controller, wherein the programmable control logic is configured to operate both in a first mode and a second mode allowing the servo controller to process servo data from a read channel device;
receiving control signal for capturing servo field data; and
organizing servo field data,
wherein the first mode is an m wire mode, the second mode is an n wire mode, m and n are integers, and m≠n.

11. A servo controller for an embedded disk controller, comprising:
read channel interface means that includes a programmable control logic for receiving a servo field detected signal from a module that detects a servo field start bit; and
memory means in the read channel interface that is enabled by the programmable control logic for receiving servo field data from a read channel device, wherein the programmable control logic is configured to operate in a first mode and a second mode allowing the servo controller to process servo data from the read channel device,
wherein the first mode is an m wire mode, the second mode is an n wire mode, m and n are integers, and m≠n.

12. The servo controller of claim 11 wherein in the first mode the servo controller processes the servo data at a first data width and in the second mode the servo controller processes the servo data at a second data width.

13. The servo controller of claim 11 further comprising filter means for receiving unfiltered servo data from the memory means.

14. The servo controller of claim 11 further comprising counter means for receiving the servo field detected signal.

15. The servo controller of claim 11 wherein the programmable control logic may be configured by a processor in the embedded disk controller.

* * * * *

UNITED STATES PATENT AND TRADEMARK OFFICE
CERTIFICATE OF CORRECTION

PATENT NO. : 7,336,435 B1
APPLICATION NO. : 11/388410
DATED : February 26, 2008
INVENTOR(S) : Michael R. Spaur et al.

It is certified that error appears in the above-identified patent and that said Letters Patent is hereby corrected as shown below:

| | |
|---|---|
| Column 1, Line 14 | Delete "6,936,649" and insert -- 7,080,188 -- |
| Column 1, Line 14 | Delete "Aug. 30, 2005" and insert -- July 18, 2006 -- |
| Column 4, Line 23 | Insert -- be -- after "may" |
| Column 4, Line 67 | Delete "instrument" and insert -- Instruments ® -- |
| Column 5, Line 6 | Delete "D," before "Part" and insert -- ® -- after "Instruments" |

Signed and Sealed this

Twenty-eighth Day of September, 2010

David J. Kappos
*Director of the United States Patent and Trademark Office*